United States Patent
van den Broek et al.

(10) Patent No.: US 10,115,219 B2
(45) Date of Patent: Oct. 30, 2018

(54) GRID AND TABLE ANIMATIONS TO PROVIDE CONTEXT DURING SORT OPERATIONS

(71) Applicant: Oracle International Corporation, Redwood Shores, CA (US)

(72) Inventors: Hendrik van den Broek, Lexington, MA (US); Chadwick Chow, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 14/225,392

(22) Filed: Mar. 25, 2014

(65) Prior Publication Data
US 2015/0279078 A1 Oct. 1, 2015

(51) Int. Cl.
| | |
|---|---|
| G06T 13/80 | (2011.01) |
| G06F 3/0485 | (2013.01) |
| G06F 17/30 | (2006.01) |
| G06F 3/0481 | (2013.01) |

(52) U.S. Cl.
CPC ........... *G06T 13/80* (2013.01); *G06F 3/0481* (2013.01); *G06F 3/0485* (2013.01); *G06F 17/30572* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 7,164,423 B1 * | 1/2007 | Westen | ............ | G06Q 10/107 345/473 |
| 7,692,658 B2 * | 4/2010 | Moore | ............ | G06T 13/80 345/473 |
| 8,739,023 B2 * | 5/2014 | Nemati | ............ | G06F 17/30905 715/234 |
| 8,966,385 B2 * | 2/2015 | Sako | ............ | G06F 19/321 705/2 |

(Continued)

OTHER PUBLICATIONS

Rautama, Erkki, Erkki Sutinen, and Jorma Tarhio. "Excel as an algorithm animation environment." ACM SIGCSE Bulletin. vol. 29. No. 3. ACM, 1997.*

(Continued)

*Primary Examiner* — Ryan M Gray
(74) *Attorney, Agent, or Firm* — Trellis IP Law Group, PC

(57) ABSTRACT

A table display presents animation to show changes in sorting and/or filtering criteria, providing users with visual references about the sorting operation and illustrating relationships between data elements before and after sorting, including data that was off-screen prior to sorting. A table presents a portion of a data element set arranged according to a first sorting criteria, such as the data field value in each data element. Upon receiving a second sorting criteria, a new arrangement of the data elements visible in the table is determined. Animation data is determined to specify the motion of visible and non-visible data elements from their locations under the first sorting criteria to their locations under the second sorting criteria. The transition animation is then initiated to show the movement of data elements from their locations under the first sorting criteria to their locations under the second sorting criteria.

15 Claims, 8 Drawing Sheets

(56) References Cited

U.S. PATENT DOCUMENTS

| | | | | |
|---|---|---|---|---|
| 2006/0271883 | A1* | 11/2006 | Bier | G06F 17/30873 |
| | | | | 715/853 |
| 2008/0303827 | A1* | 12/2008 | Schiff | G06F 17/212 |
| | | | | 345/473 |
| 2011/0163968 | A1* | 7/2011 | Hogan | G06F 3/04883 |
| | | | | 345/173 |
| 2012/0313957 | A1* | 12/2012 | Fisher | G06T 11/206 |
| | | | | 345/589 |
| 2013/0055061 | A1* | 2/2013 | Ashley-Rollman | |
| | | | | G06F 17/245 |
| | | | | 715/228 |
| 2013/0055167 | A1* | 2/2013 | Leong | G06F 3/048 |
| | | | | 715/854 |
| 2013/0159936 | A1* | 6/2013 | Yamaguchi | G06F 3/0485 |
| | | | | 715/850 |
| 2013/0314341 | A1* | 11/2013 | Lee | G06F 3/0488 |
| | | | | 345/173 |
| 2014/0075286 | A1* | 3/2014 | Harada | G06F 3/04886 |
| | | | | 715/234 |
| 2014/0143260 | A1* | 5/2014 | Simonson | G06F 17/245 |
| | | | | 707/752 |
| 2014/0188907 | A1* | 7/2014 | Benchenaa | G06F 17/30994 |
| | | | | 707/752 |

OTHER PUBLICATIONS

Hansen, Steven R. A Framework for Effective Algorithm Visualization Using Animation-Embedded Hypermedia. No. FY99-96. Air force inst of tech wright-pattersonafb oh school of engineering, 1999.*

"jQuery Animated Table Sorter"; downloaded circa Jan. 16, 2014; 8 pages.

* cited by examiner

110

| Employee ID | First Name | Last Name | Email Address | Phone Number | Date Hired | Salary | Department ID |
|---|---|---|---|---|---|---|---|
| 100 | Steven | King | SKING | 515.123.4567 | 17-Jun-87 | 24000 | 90 |
| 101 | Neens | Kochhar | NKOCHHAR | 515.123.4568 | 21-Sep-89 | 17000 | 90 |
| 102 | Lex | De Haan | LDEHAAN | 515.123.4559 | 13-Jan-93 | 17000 | 90 |
| 103 | Alexander | Hunold | AHUNOLD | 590.423.4567 | 3-Jan-90 | 9000 | 60 |
| 104 | Bruce | Ernst | BERNST | 590.423.4568 | 21-May-91 | 6000 | 60 |
| 105 | David | Austin | DAUSTIN | 590.423.4569 | 25-Jun-97 | 4800 | 60 |
| 106 | Valli | Pataballa | VPATABAL | 590.423.4550 | 5-Feb-98 | 4800 | 60 |
| 107 | Diana | Lorentz | DLORENTZ | 590.423.5567 | 7-Feb-99 | 4200 | 60 |
| 108 | Nancy | Greenberg | NGREENBE | 515.124.4569 | 17-Aug-94 | 12000 | 100 |
| 109 | Daniel | Faviet | DFAVIET | 515.124.4169 | 16-Aug-94 | 9000 | 100 |
| 110 | John | Chen | JCHEN | 515.124.4269 | 28-Sep-97 | 8200 | 100 |
| 111 | Ismael | Sciarra | ISCIARRA | 515.124.4369 | 30-Sep-97 | 7700 | 100 |
| 112 | Jose Manual | Urman | JMURMAN | 515.124.4469 | 7-Mar-98 | 7800 | 100 |
| 113 | Luis | Popp | LPOPP | 515.124.4567 | 7-Dec-99 | 6900 | 100 |
| 114 | Den | Rsphaely | DRAPHEAL | 515.127.4561 | 7-Dec-94 | 11000 | 30 |
| 115 | Alexander | Khoo | AKHOO | 515.127.4562 | 18-May-95 | 3100 | 30 |
| 116 | Shelli | Baida | SBAIDA | 515.127.4563 | 24-Dec-97 | 2900 | 30 |
| 117 | Sigal | Tobias | STOBIAS | 515.127.4554 | 24-Jul-97 | 2800 | 30 |
| 118 | Guy | Himuro | GHIMURO | 515.127.4555 | 15-Nov-98 | 2600 | 30 |
| 119 | Karen | Colmenares | KCOLMENA | 515.127.4566 | 10-Aug-99 | 2500 | 30 |

115A — row 100
113A — rows 101–105
115B — row 106
113B — rows 107–115
115C — row 116
115D — row 117
113C — rows 118–119

FIG. 1B

| 120 | | | | | | | |
|---|---|---|---|---|---|---|---|
| 101 | Neens | Kochhar | NKOCHHAR | 515.123.4568 | 21-Sep-89 | 17000 | 90 |
| 107 | Diana | Lorentz | DLORENTZ | 590.423.5567 | 7-Feb-99 | 4200 | 60 |
| 108 | Nancy | Greenberg | NGREENBE | 515.124.4569 | 17-Aug-94 | 12000 | 100 |
| 109 | Daniel | Faviet | DFAVIET | 515.124.4169 | 16-Aug-94 | 9000 | 100 |
| 110 | John | Chen | JCHEN | 515.124.4269 | 28-Sep-97 | 8200 | 100 |
| 111 | Ismael | Sciarra | ISCIARRA | 515.124.4369 | 30-Sep-97 | 7700 | 100 |
| 112 | Jose Manual | Urman | JMURMAN | 515.124.4469 | 7-Mar-98 | 7800 | 100 |
| 114 | Den | Rsphaely | DRAPHEAL | 515.127.4561 | 7-Dec-94 | 11000 | 30 |

| Employee ID | First Name | Last Name | Email Address | Phone Number | Date Hired | Salary | Department ID |
|---|---|---|---|---|---|---|---|
| 100 | Steven | King | SKING | 515.123.4567 | 17-Jun-87 | 24000 | 90 |
| 106 | Valli | Pataballa | VPATABAL | 590.423.4550 | 5-Feb-98 | 4800 | 60 |
| 116 | Shelli | Baida | SBAIDA | 515.127.4563 | 24-Dec-97 | 2900 | 30 |
| 117 | Sigal | Tobias | STOBIAS | 515.127.4554 | 24-Jul-97 | 2800 | 30 |
| 180 | Winston | Taylor | WTAYLOR | 650.507.9876 | 24-Jan-98 | 3200 | 50 |
| 206 | William | Gietz | WGEITZ | 515.123.8181 | 7-Jun-94 | 8300 | 110 |
| 171 | William | Smith | WSMITH | 011.44.1343.6211 | 23-Feb-99 | 7400 | 80 |
| 195 | Vance | Jones | VJONES | 650.501.4876 | 17-Mar-99 | 2800 | 50 |
| 141 | Trenna | Rajs | TRAJS | 650.121.8009 | 17-Oct-95 | 3500 | 50 |
| 190 | Timothy | Gates | TGATES | 650.505.3876 | 11-Jul-98 | 2900 | 50 |
| 170 | Tayler | Fox | TFOX | 011.44.1343.7252 | 24-Jan-98 | 9600 | 80 |
| 173 | Sundita | Kumar | SKUMAR | 011.44.1343.3533 | 21-Apr-00 | 6100 | 80 |
| 166 | Sundar | Ande | SANDE | 011.44.1346.6622 | 24-Mar-00 | 6400 | 80 |
| 138 | Stephan | Stiles | SSTILES | 650.121.2034 | 26-Oct-97 | 3200 | 50 |
| 205 | Shelly | Higgins | SHIGGINS | 515.123.8080 | 7-Jun-94 | 12000 | 110 |
| 161 | Sarath | Sewall | SSEWALL | 011.44.1345.5522 | 3-Nov-98 | 7000 | 80 |

| Employee ID | First Name | Last Name | Email Address | Phone Number | Date Hired | Salary | Department ID |
|---|---|---|---|---|---|---|---|
| 180 | Winston | Taylor | WTAYLOR | 650.507.9876 | 24-Jan-98 | 3200 | 50 |
| 206 | William | Gietz | WGEITZ | 515.123.8181 | 7-Jun-94 | 8300 | 110 |
| 171 | William | Smith | WSMITH | 011.44.1343.6211 | 23-Feb-99 | 7400 | 80 |
| 195 | Vance | Jones | VJONES | 650.501.4876 | 17-Mar-99 | 2800 | 50 |
| 106 | Valli | Pataballa | VPATABAL | 590.423.4550 | 5-Feb-98 | 4800 | 60 |
| 141 | Trenna | Rajs | TRAJS | 650.121.8009 | 17-Oct-95 | 3500 | 50 |
| 190 | Timothy | Gates | TGATES | 650.505.3876 | 11-Jul-98 | 2900 | 50 |
| 170 | Tayler | Fox | TFOX | 011.44.1343.7252 | 24-Jan-98 | 9600 | 80 |
| 203 | Susan | Mavris | SMAVRIS | 515.123.7777 | 7-Jun-94 | 6500 | 40 |
| 173 | Sundita | Kumar | SKUMAR | 011.44.1343.3533 | 21-Apr-00 | 6100 | 80 |
| 166 | Sundar | Ande | SANDE | 011.44.1346.6622 | 24-Mar-00 | 6400 | 80 |
| 100 | Steven | King | SKING | 515.123.4567 | 17-Jun-87 | 24000 | 90 |
| 138 | Stephan | Stiles | SSTILES | 650.121.2034 | 26-Oct-97 | 3200 | 50 |
| 117 | Sigal | Tobias | STOBIAS | 515.127.4554 | 24-Jul-97 | 2800 | 30 |
| 116 | Shelli | Baida | SBAIDA | 515.127.4563 | 24-Dec-97 | 2900 | 30 |
| 205 | Shelly | Higgins | SHIGGINS | 515.123.8080 | 7-Jun-94 | 12000 | 110 |
| 161 | Sarath | Sewall | SSEWALL | 011.44.1345.5522 | 3-Nov-98 | 7000 | 80 |

```
function generateAnimationData(newSortingCriteria)
{
        //Get set of visible data elements prior to new sorting.
        presortedDataElements = getCurrentVisibleDataElements();

//Get current table range
        currentTableRange = getCurrentTableRange();

//Get set of visible data elements after new sorting
        postsortedDataElements = sortDataElements(newSortingCriteria, currentTableRange);

//Get retained data elements visible in both pre- and post-sorting (A ∩ B in set notation)
        retainedDataElements = set_intersection(presortedDataElements, postsortedDataElements);

//Identify off-screen data elements visible pre-sorting and off-screen post-sorting (A ∩ B_complement in set notation)
        offscreenDataElements = all data elements in presortedDataElements and not in postsortedDataElements;

//Get new data elements off-screen pre-sorting and visible post-sorting (A_complement ∩ B in set notation)
        newDataElements = all data elements in postsortedDataElements and not in presortedDataElements;

//Initialize list of elements to animate
        animateElements = [];

//Add retained data elements to animation list
        for each element i in retainedDataElements{ animateElements[i].startingPosition = presortedDataElements[i].position;
                animateElements[i].endingPosition = postsortedDataElements[i].position;
        }

//Add off-screen data elements to animation list
        for each element i in offscreenDataElements{ animateElements[i].startingPosition = presortedDataElements[i].position;

//Ending off-screen position may be predetermined or based on pre- or post-sorting position of element.
                animateElements[i].endingPosition = selectOffscreenLocation();
        }

//Add new data elements to animation list
        for each element i in newDataElements{

//Starting off-screen position may be predetermined or based on pre- or post-sorting position of element.
                animateElements[i].startingPosition = selectOffscreenLocation();

animateElements[i].endingPosition = postsortedDataElements[i].position;
        }

//Return list of elements to animate and their respective starting and ending positions.
        return animateElements;
}
```

```
function executeAnimation(animateElements, animationDuration){

//Set animation starting and ending times
        startTime = getCurrentTime();
        endTime = startTime + animationDuration;

while (animationDone == FALSE){
                //Get current animation frame
                frame = (getCurrentTime()-startTime)/animationDuration;

for each element i in animateElements{
                        //Determine each element's position at current frame by
interpolating between starting and ending positions
                        animateElements[i].currentPosition =
interpolate(animateElements[i].startingPosition, animateElements[i].startingPosition,
frame);
                        //Draw element at new position
                        drawDataElements(animateElements[i]);
                } if (getCurrentTime() >= endTime){
                        animationDone = TRUE;
                } else {
                        wait(frameDuration);
                }
        }
}
```

FIG. 3B

GRID AND TABLE ANIMATIONS TO PROVIDE CONTEXT DURING SORT OPERATIONS

BACKGROUND

The field of the invention relates to user interfaces and specifically to systems and methods for arranging data sets for analysis. Many applications operate on data tables and display data that can be sorted and/or filtered. Additionally, these data sets are often large and cannot be displayed in their entirety on a single display screen. To accommodate this, many applications includes commands and user interface elements to control the data sorting or ordering and also scrolling the visible portion of the data set to reveal portions of the data set that were previously off-screen.

When a user changes the sorting criteria, many prior applications immediately change the displayed portion of the data set to reflect the new ordering of data. However, because this change is virtually instantaneous (from the user's perspective), it may be difficult for the user to understand the relationship between the displayed data prior to sorting with that displayed after changing the sorting criteria. This problem is exacerbated when displaying large data sets. In these situations, much of the data set is off-screen and not visible to the user. Thus, changing the sorting criteria may result in substantial amounts of data that was previously off-screen becoming instantaneously visible, without any context or other indication of its relationship to the displayed data prior to the change.

SUMMARY

Embodiments of the invention animate the transition between data views following a change in sorting and/or filtering criteria. These transition animations provide users with a visual reference about the effects of the sorting operation. Additionally, these transition animations illustrate the relationships between the data before and after sorting, including data that was off-screen prior to sorting.

In an embodiment, a table presents a portion of a set of data elements to users. The visible portion of the data set may be arranged according to a first sorting criteria, such as the value of a data field in each data element. Upon receiving a second sorting criteria, an embodiment of the invention determines a new arrangement of a second portion of the data elements visible in the table based on the second sorting criteria. This embodiment of the invention then generates animation data specifying the motion of visible and non-visible data elements from their locations under the first sorting criteria to their locations under the second sorting criteria. In embodiments of the invention, the animation can include at least one data element not visible under the first sorting criteria becoming visible in the table under the second sorting criteria.

In embodiments of the invention, data elements that are visible in the table under the first sorting criteria and not visible under the second sorting criteria may be moved to off-screen locations during the transition animation. Similarly, data elements that are visible in the table under the second sorting criteria and not visible under the first sorting criteria may be moved from off-screen locations into the table during the transition animation. For example, these off-screen locations may be selected randomly, based on a predetermined location, based on the nearest off-screen location to the starting or ending location, and/or based on the first or second sorting criteria.

Additionally, embodiments of the invention may specify changes in other visual aspects of the data elements during and optionally after the transition animation, including changes in data element background and border colors and line and fill patterns; font type and/or font size; transparency or opacity of the data elements; and depth relative to other visual elements or other representations of compositing order.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIGS. 1A-1D illustrate an example transition animation according to an embodiment of the invention;

FIGS. 3A-3B are pseudocode listings illustrating implementations of embodiments of the invention.

DETAILED DESCRIPTION OF EMBODIMENTS

Embodiments of the invention animate the transition between data views following a change in sorting and/or filtering criteria. These transition animations provide users with a visual reference about the effects of the sorting operation. Additionally, these transition animations illustrate the relationships between the data before and after sorting, including data that was off-screen prior to sorting.

Figure 1A:
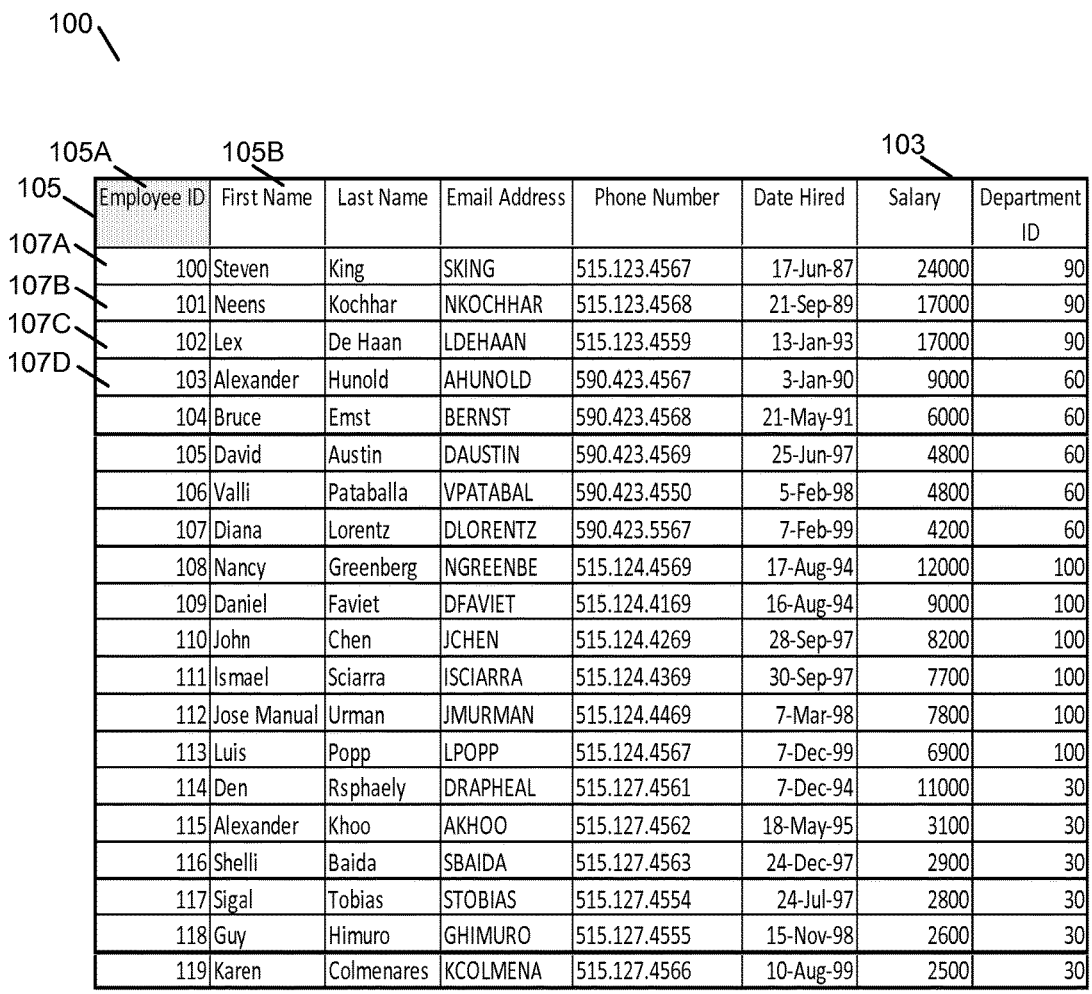

FIGS. 1A-1D illustrate an example transition animation according to an embodiment of the invention. FIG. 1A illustrates an example initial view 100 of a portion of a data set prior to a change in sorting criteria. Initial view 100 displays all or a portion of a data set in the form of a table 103 including header row 105 and multiple rows 107 including rows 107A-107D. If the data set includes more data elements than can be displayed simultaneously, then example table 103 may be scrolled horizontally or vertically to reveal additional data elements.

In this example, each of the rows 107 represents a separate data item or element. Each data element may include multiple data field values. Table 103 partitions each of the rows 107 into multiple columns. Each column represents a different data field and, for any given row, the value in each column represents the value of a data field for the data element associated with that row.

Header row 105 displays names associated with each data field, such as the example data fields "Employee ID," "First Name," "Last Name," "Email Address," "Phone Number," "Date Hired," "Salary," and "Department ID." These data fields are provided for the purpose of illustration and embodiments of the invention can be applied to data elements including any number and any type of data field, including data fields with different data types.

In addition to providing a visual reference for the data types, header row 105 may also be used to display and/or modify the sorting criteria used to arrange the presentation of data elements. For example, header row element 105A representing the "Employee ID" is shaded to indicate to users that the data elements are displayed sorted according to employee ID number. In further implementations, a user may select any of the header row labels via a graphical user interface to sort and/or filter the data set according to that data field in ascending or descending order. For example, a user selection of header row label 105B "First Name" will sort the data elements according to the values of the first name data field. In alternate implementations, other input devices and user interface techniques may be used to specify sorting and/or filtering criteria, including command line and text-based interfaces, voice input, and gesture inputs.

Upon changing the sorting and/or filtering criteria, such as changing the sort criteria from "Employee ID" to "First Name," embodiments of the invention generate a transition animation that illustrates the rearrangement of data according to the new sorting criteria. These transition animations provide users with a visual reference about the effects of the sorting operation and illustrate the relationships between the data before and after sorting, including data that was off-screen prior to sorting.

FIG. 1B illustrates an example view 110 of a portion of a data set following an example change of sorting criteria from "Employee ID" to "First Name." To create a transition animation, an embodiment of the invention identifies data elements, if any, that will be off-screen and not visible to the user after the data elements are sorted according to the new sorting criteria (without scrolling the data set). These "off-screen" data elements 113A-113C are illustrated with dotted shading in view 110. Similarly, an embodiment of the invention also identifies data elements that stay on-screen and visible to the user (without scrolling the data set) under both the previous and new sorting criteria. These "retained" data elements 115A-115D are illustrated with cross-hatched shading in view 110. Although the off-screen and retained data sets 113 and 115 are shown with shading in view 110, embodiments of the invention may use different colors or other visual indicators, or omit these visual indicators altogether.

Additionally, there may be additional data elements that are off-screen and not visible to the user in the previous sorting criteria that will become visible to the user under the new sorting criteria. These "new" data elements are not visible in view 110, but will become visible during the transition animation. As described in detail below, an embodiment of the invention identifies these new data elements prior to initiating the transition animation, so that these data elements can be retrieved from storage or via a network, if necessary, and the transition animation planned in advance.

FIG. 1C illustrates an example view 120 of a portion of a data set during a transition animation according to an embodiment of the invention. In view 120, data elements are moved to on- and off-screen locations based on the new sorting criteria. For clarity, the boundary of table 103 is shown as an outline in view 120.

For example, the off-screen data elements 113 are moved 125A off-screen, as these data elements will not be visible under the new sorting criteria without scrolling the data set view from its current scroll position. In an embodiment, some of the off-screen data elements 113 may overlap during motion 125. This may be acceptable during motion 125A, because the goal of motion 125A is to provide users with a general sense of the relationships between data elements rather than specific data field values of data elements.

Similarly, the retained data elements 115 are moved to their new locations in table 103. For example, retained data elements 115A and 115B undergo motions 125B and 125C, respectively, to new locations in table 103. Additionally, retained data elements 115C and 115D exchange positions in table 103 through motion 125D.

Finally, new data elements 123, which were off-screen and not visible to users under the previous sorting criteria, are moved on-screen and into their appropriate positions in table 103 through motion 125E. In FIG. 1C, the new data elements 123 are unshaded; however, embodiments of the invention may use color, shading, or any other visual indicator to highlight new data elements during the transition animation.

In an embodiment, motions 125A-125E occur automatically following a change in sorting and/or filtering criteria. In a further embodiment, motions 125A-125E occur simultaneously, so that off-screen data elements are moved out of view at approximately the same time that new data elements are moved into view. In an alternate embodiment, motions 125A-125E may be performed, at least in part, sequentially.

FIG. 1D illustrates an example view 130 of a portion of a data set following a transition animation. In view 130, the new data elements 123 and retained data elements 115 are arranged in table 103 according to the new sorting criteria. For example, table 103 includes new data elements in subsets 123A-123C interspersed with retained data elements 115A-115D. The shading associated with data elements may be retained or removed following the completion of the data animation.

Upon completion of the transition animation, as shown in view 130, embodiments of the invention may allow users to interact with the table 103 and displayed data elements. Additionally, embodiments of the invention may enable the user to scroll the table 103 vertically and/or horizontally to reveal additional off-screen data elements and/or data fields.

Figure 2:
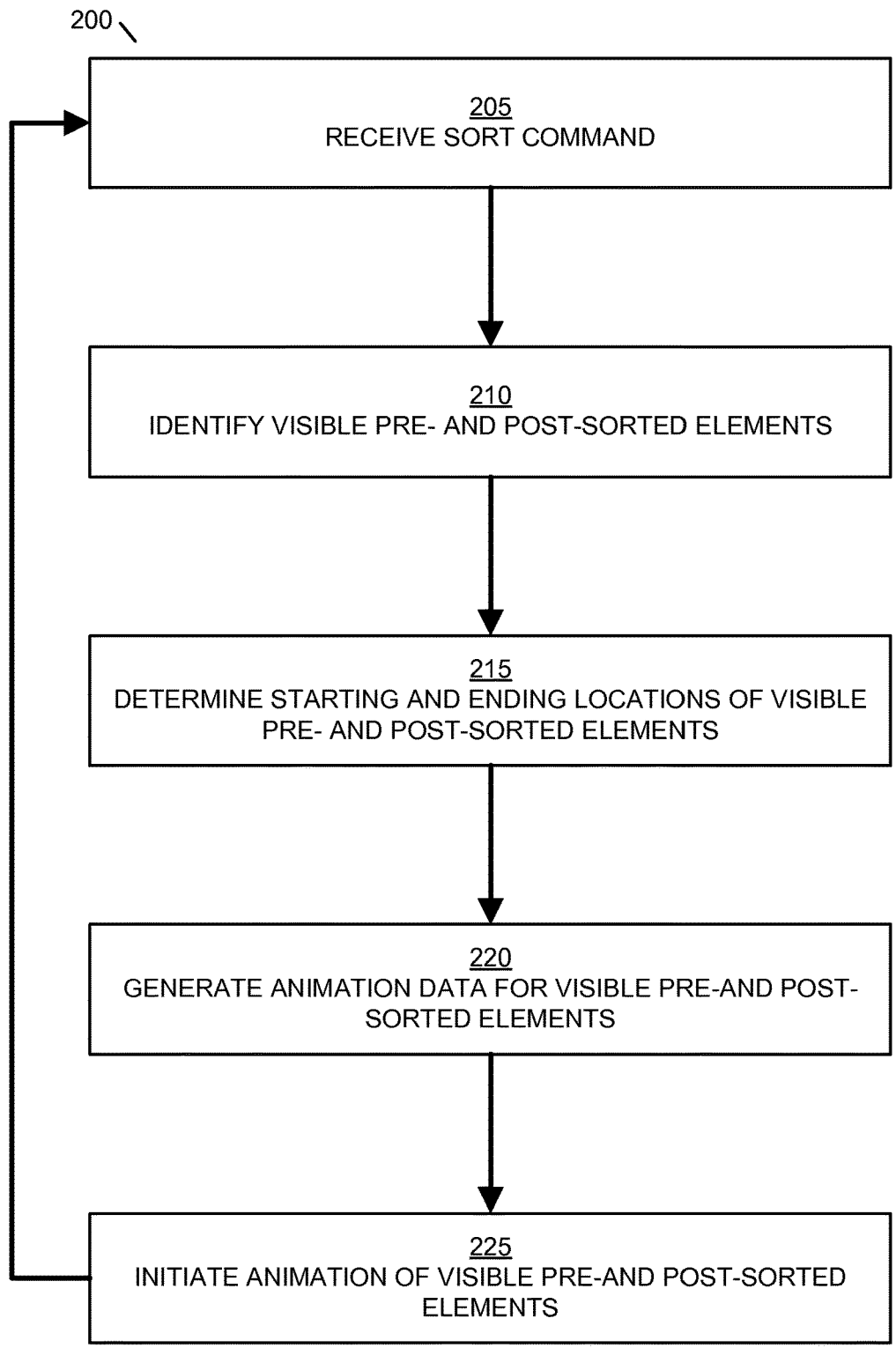
FIG. 2 illustrates a method of generating a transition animation according to an embodiment of the invention.

FIG. 2 illustrates a method 200 of generating a transition animation according to an embodiment of the invention. Step 205 receives a sorting and/or filtering command from a user via a user interface. As described above, user interfaces may include graphical user interfaces, command line and text-based interfaces, voice input interfaces, and gesture input interfaces.

Step 210 identifies the data elements that are visible pre- and post-sorting. In an embodiment, step 210 executes the sorting and/or filtering operation (or receives the results of the sorting and/or filtering operation from another program module) to determine the data elements visible to the user following the completion of the transition animation. This set of visible post-sorting data elements is compared with the visible pre-sorting data elements to identify retained data elements, which are data elements that are visible both pre- and post-sorting; off-screen data elements, which are data elements that are visible pre-sorting and off-screen post-sorting; and new data elements, which are data elements that are off-screen pre-sorting and visible post-sorting.

Step 215 then determines the starting and ending locations of the visible pre- and post-sorted data elements, including the retained data elements, the off-screen data elements, and the new data elements. In an embodiment, the starting locations of the retained data elements are their locations in the table prior to receiving the sorting and/or filtering command in step 205. The ending locations of the retained data elements are their locations in the table following the sorting and filtering operations.

For the off-screen data elements, step 215 sets their starting locations to their locations in the table prior to receiving the sorting and/or filtering command in step 205. Embodiments of step 215 have many possible options for determining the data elements ending locations, including, without limitation, random off-screen locations for each off-screen data element; off-screen locations for each off-screen data element based on the new sorting criteria, such as moving data elements coming before the display area under the new sorting criteria to an off-screen area above the table and data elements coming after the display area under the new sorting criteria to an off-screen area below the table; off-screen locations nearest to the data elements' pre-sorted locations, such as moving data elements near the bottom of the table to an off-screen location below the table and data elements near the top of the table to an off-screen location above the table; and/or setting all off-screen data elements ending locations to one side of the screen, as is shown for example in FIG. 1C, where all of the off-screen data elements move off-screen via the top edge of the screen. In further embodiments, the off-screen locations may be based on the relative location of the table view with respect to the data set. For example, if the table's view is at the beginning of the data set, then off-screen locations may be set to below the table.

For the new data elements, embodiments of step 215 have many possible options for determining the data elements starting locations, including without limitation random off-screen locations for each new data element; off-screen locations for each new data element based on their relative locations with respect to the table prior to receiving the sorting command in step 215; off-screen locations nearest to the data elements' post-sorted locations; and/or setting all new data elements starting locations to one side of the screen, as is shown for example in FIG. 1C, where all of the new data elements move on-screen via the bottom edge of the screen. Additionally, step 215 sets the ending locations of the new data elements to their locations in the table following the completion of the sorting and/or filtering operation.

Step 220 generates animation data for each of the visible pre- and post-sorted data elements based on the starting and ending positions determined in step 215. In an embodiment, step 220 includes animation path data defining the motion of each data element from its starting location to its ending location. The motion of each data element may include linear and/or non-linear motion, time-varying velocity and optionally acceleration, motion easing, and any other type of motion or animation effects known in the art. Additionally, embodiments of step 220 may specify changes in other visual aspects of the data elements during and optionally after the transition animation, including changes in data element background and border colors and line and fill patterns; font type and/or font size; transparency or opacity of the data elements; and depth relative to other visual elements or other representations of compositing order.

Step 225 initiates the transition animation of the visible pre- and post-sorted elements. In an embodiment, step 225 forwards the animation data to graphics and animation functions included in a standalone application, an application library or framework, a web browser or other platform, or an operating system. The graphics and animation functions then execute the transition animation according to the provided animation data and may optionally return an indication of the progress and/or completion of the transition animation to the application. In another embodiment, step 225 performs the transition animation itself by providing commands to update the data elements' on-screen positions as a function of time as specified by the animation data.

Following step 225 and the completion of the transition animation, embodiments of method 200 resume normal operation of the application and the table interface for presenting, receiving, and/or modifying data elements and their data fields. Method 200 may be repeated starting with step 205 if further sorting and/or filtering commands are received.

FIGS. 3A-3B are pseudocode listings illustrating implementations of embodiments of the invention. FIG. 3A is a pseudocode listing 300 of an example function for generating animation data for a transition animation. This example pseudocode function first determines the data elements visible in the table pre-sorting and post-sorting using a sorting criteria provided to the function.

In pseudocode listing 300, this example function identifies the retained data elements, the off-screen data elements, and the new data elements by comparing the lists of pre-sorted and post-sorted data elements. For example, the retained data elements are the set of data elements in both the pre-sorted and post-sorted lists. This may be expressed as the set intersection of these two lists, or retained_data_elements=pre-sorted_set ∩ post-sorted_set.

In pseudocode listing 300, this example function identifies the off-screen data elements as the set of data elements in the pre-sorted list and not in the post-sorted list. This may be expressed as the set intersection of the pre-sorted list and the complement of the post-sorted list, or offscreen_data_elements=pre-sorted_set ∩ post-sorted_set$^C$. Similarly, the pseudocode listing 300 identifies the new data elements as the set of data elements in the post-sorted list and not in the pre-sorted list. This may be expressed as the set intersection of the post-sorted list and the complement of the pre-sorted list, or new_data_elements=post-sorted_set ∩ pre-sorted_set$^C$.

Once the sets of retained, off-screen, and new data elements are identified, the example pseudocode listing 300 determines starting and ending positions for each of these data elements in the transition animation. For retained data elements, their starting positions are their respective pre-sorted positions and their ending positions are their respective post-sorted positions. For off-screen data elements, their starting positions are their respective pre-sorted positions and their ending positions are off-screen locations, selected as described above. For new data elements, their starting positions are off-screen locations, selected as described above, and their ending positions are their respective post-sorted positions.

Example pseudocode listing 300 then returns the list of data elements to be animated, including their respective starting and ending positions.

FIG. 3B is a pseudocode listing 350 of an example function for animating data elements in a transition animation. The function receives a list of data elements to be animated including their respective starting and ending positions. The example function also receives a desired animation duration.

The example function of pseudocode listing 350 then initializes itself with an animation starting time and an animation ending time. The function then begins an animation loop to animate the data elements. For each animation loop iteration, the function determines the current animation frame based on the current time, the animation starting time, and the animation duration. For each data element in the list of animated data elements, the animation loop determines a current position of the data element by interpolating between its respective starting and ending positions using the current frame. As described above, embodiments of the invention may use any type of linear or non-linear animation known in the art to determine the positions of data elements. Once the example animation loop has determined the current position of a data element, the example function draws the data element on screen at its current position.

Once all of the data elements to be animated have been drawn, the animation loop determines if the animation is complete. If not, the animation loop pauses for a time duration based on the desired frame rate and is then repeated.

Figure 4:
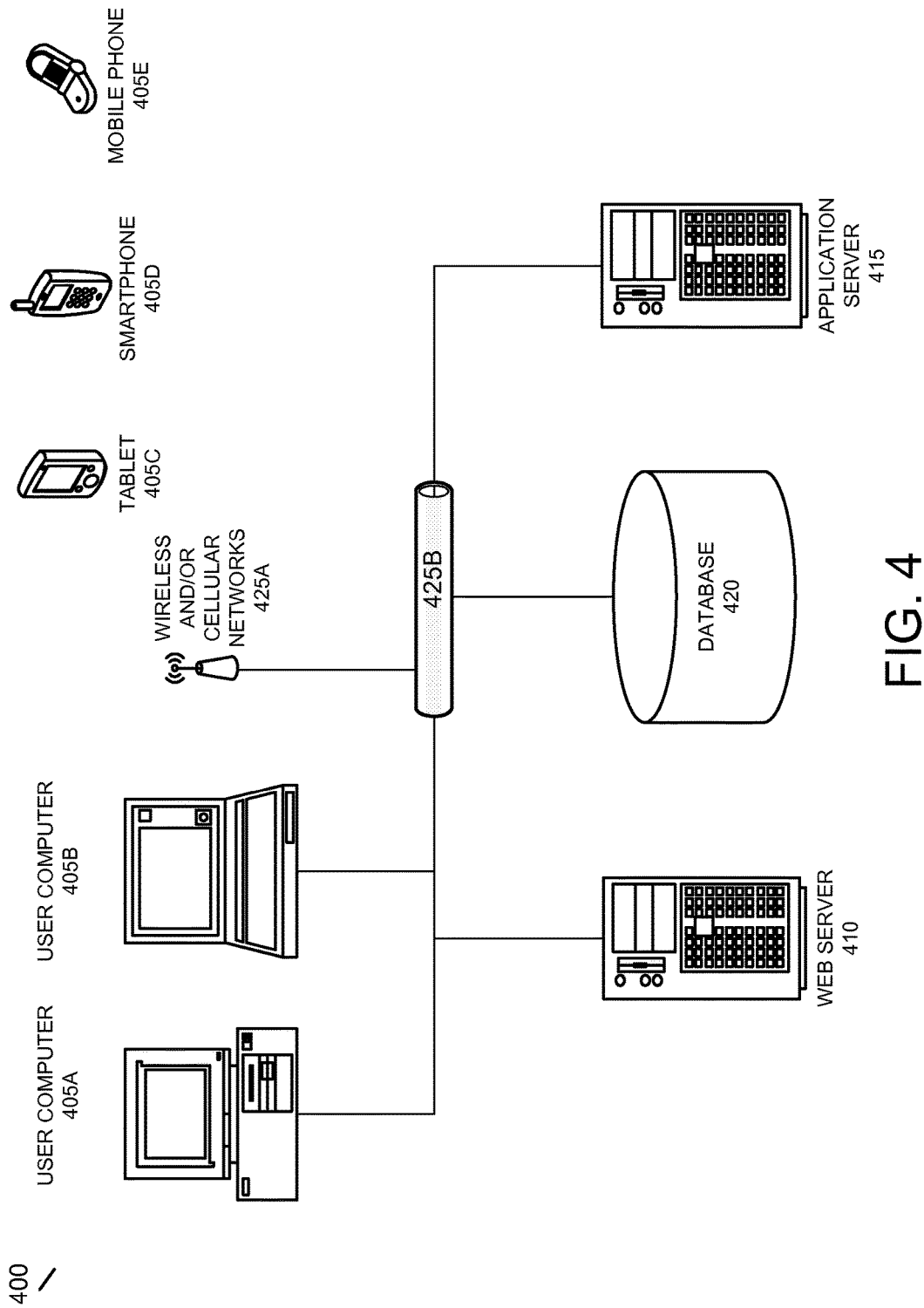
FIG. 4 illustrates an example system suitable for implementing embodiments of the invention.

FIG. 4 illustrates an example system 400 suitable for implementing embodiments of the invention. Embodiments of the invention may be implemented as standalone applications or as web-based applications implemented using a combination of client-side and server-side code. FIG. 4 shows an example computer and network system architecture 400 suitable for implementing embodiments of the invention. The system includes user computers 405 including desktop 405A and portable personal computers 405B, tablets 405C, smartphones 405D, and mobile phones 405E. The system can interface with any type of electronic device, such as a thin-client computer, Internet-enabled mobile telephone, mobile Internet access device, tablet, electronic book, or personal digital assistant, capable of displaying and navigating web pages or other types of electronic documents and/or executing applications. Although the system 400 is shown with five user computers, any number of user computers can be supported.

A web server 410 is used to process requests from web browsers and standalone applications for web pages, electronic documents, enterprise data or other content, and other data from the user computers. The server 410 may also provide the menu application, as well as syndicated content, such as RSS feeds, of data related to enterprise operations.

Application server 415 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 415 process input data and user computer requests and can store or retrieve data from database 420. Database 420 stores data created and used by the data applications. In an embodiment, the database 420 is a relational database that is adapted to store, update, and retrieve data in response to SQL format commands or other database query languages. In other embodiments, unstructured data storage architectures and NoSQL databases may also be used.

In an embodiment, the application server 415 is one or more general-purpose computers capable of executing programs or scripts. In an embodiment, the web server 410 is implemented as an application running on one or more general-purpose computers. The web server and application server may be combined and executed on the same computers.

An electronic communication network 425 enables communication between user computers 405, web server 410, application server 415, and database 420. In an embodiment, network 425 may further include any form of electrical or optical communication devices, including wireless 425A and wired 425B networks. Network 425 may also incorporate one or more local-area networks, such as an Ethernet network; wide-area networks, such as the Internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. Any suitable programming language can be used to implement the routines of particular embodiments. Any type of programming techniques may be employed including procedural, functional, and/or object oriented programming techniques. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Computer-readable storage mediums include, without limitation, volatile and non-volatile electronic memory devices, including static and dynamic RAM, ROM, EPROM, EEPROM, and flash memory; fixed and removable magnetic data storage media and devices; and optical storage media and devices. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, executed by a computer system, of visualizing an arrangement of data elements in a table in a graphical user interface (GUI), the method comprising:

displaying a table in the GUI including a first portion of a data element set in a first arrangement based on a first sorting criteria;

receiving a user input including a second sorting criteria;

based on the second sorting criteria, determining portions of the data element set that after sorting will be a "retained on-screen" portion, a "off-screen" portion, and a "new on-screen" portion;

determining random off-screen locations for each on-screen-to-off-screen-data-elements that are "on-screen" before the second sorting criteria and will become part of the "off-screen" portion;

changing a first visual aspect of the "retained on-screen" portion of the data element set, wherein the first visual aspect includes at least one of: a data element background color; a data element background fill pattern; a data element border color; a data element line pattern; a data element font type; a data element font size; a data element depth; or a data element compositing order;

generating animation data including first motions of the first portion of the data element set from the first arrangement to a second arrangement based on the second sorting criteria, second motions of the "new on-screen" portion of the data element set to the second arrangement, and third motions of the on-screen-to-off-screen-data-elements, wherein an off-screen data element of the "off-screen" portion comes on-screen and is interspersed with data elements of the "retained on-screen" portion, and wherein the on-screen-to-off-screen-data-elements are moved to the random-off-screen locations; and displaying an animation in the GUI based on the animation data, wherein the animation starts from the first arrangement and ends in the second arrangement, wherein the first sorting criteria and the second sorting criteria are displayed as labels of columns located at top of the table as part of the displaying of the table and as part of the displaying of the animation, and wherein the columns are the same for the first arrangement and the second arrangement.

2. The method of claim 1, wherein at least one data element in the data element set is included in both the first and "new on-screen" portions of the data element set.

3. The method of claim 1, wherein the second sorting criteria includes a filtering criteria.

4. The method of claim 1, further comprising changing an additional visual aspect of one of the "off-screen" portion and the "new on-screen" portion of the data element set.

5. The method of claim 1, wherein the first portion of the data element set includes a first data element, wherein the first motions include a first ending location of the first data element not visible in the table in the second arrangement.

6. The method of claim 5, wherein the first ending location is based on one of the random off-screen locations.

7. The method of claim 1, wherein the "new on-screen" portion of the data element set includes a first data element, wherein the second motions include a second starting location of the first data element not visible in the table in the first arrangement, and a second ending location.

8. The method of claim 7, wherein the second starting location is based on a random off-screen location.

9. The method of claim 7, wherein the second starting location is based on a predetermined off-screen location.

10. The method of claim 7, wherein the second starting location is based on an off-screen location nearer to the second ending location than a second off-screen location.

11. A tangible, non-transitory computer-readable information storage medium including instructions adapted to direct a processor to perform an operation, the operation comprising:

displaying a table in a graphical user interface (GUI) including a first portion of a data element set in a first arrangement based on a first sorting criteria;

receiving a user input including a second sorting criteria;

based on the second sorting criteria, determining portions of the data element set that after sorting will be a "retained on-screen" portion, a "off-screen" portion, and a "new on-screen" portion;

determining random off-screen locations for each on-screen-to-off-screen-data-elements that are "on-screen" before the second sorting criteria and will become part of the "off-screen" portion;

changing a first visual aspect of the "retained on-screen" portion of the data element set, wherein the first visual aspect includes at least one of: a data element background color; a data element background fill pattern; a data element border color; a data element line pattern; a data element font type; a data element font size; a data element depth; or a data element compositing order;

generating animation data including first motions of the first portion of the data element set from the first arrangement to a second arrangement based on the second sorting criteria, second motions of the "new on-screen" portion of the data element set to the second arrangement, and third motions of the on-screen-to-off-screen-data-elements, wherein an off-screen data element of the "off-screen" portion comes on-screen and is interspersed with data elements of the "retained on-screen" portion, and wherein the on-screen-to-off-screen-data-elements are moved to the random-off-screen locations; and displaying an animation in the GUI based on the animation data, wherein the animation starts from the first arrangement and ends in the second arrangement, wherein the first sorting criteria and the second sorting criteria are displayed as labels of columns located at top of the table as part of the displaying of the table and as part of the displaying of the animation, and wherein the columns are the same for the first arrangement and the second arrangement.

12. The tangible, non-transitory computer-readable information storage medium of claim 11, comprising:

initiating an animation based on the animation data.

13. The tangible, non-transitory computer-readable information storage medium of claim 12, wherein at least one data element in the data element set is included in both the first and "new on-screen" portions of the data element set.

14. The tangible, non-transitory computer-readable information storage medium of claim 12, wherein the second sorting criteria includes a filtering criteria.

15. A system comprising:

a client system;

a database storing data elements; and an application server connected with the database and the client system via at least one network, wherein the application server is adapted to retrieve at least a portion of the data elements from the database and communicate the retrieved portion of the data elements with the client system;

wherein the client system includes an application including instructions executable by the client system to perform a method, the method comprising:

displaying a table in a graphical user interface (GUI) including a first portion of a data element set in a first arrangement based on a first sorting criteria;

receiving a user input including a second sorting criteria;

based on the second sorting criteria, determining portions of the data element set that after sorting will be a "retained on-screen" portion, a "off-screen" portion, and a "new on-screen" portion;

determining random off-screen locations for each on-screen-to-off-screen-data-elements that are "on-screen" before the second sorting criteria and will become part of the "off-screen" portion;

changing a first visual aspect of the "retained on-screen" portion of the data element set, wherein the first visual aspect includes at least one of: a data element background color; a data element background fill pattern; a data element border color; a data element line pattern; a data element font type; a data element font size; a data element depth; or a data element compositing order;

generating animation data including first motions of the first portion of the data element set from the first arrangement to a second arrangement based on the second sorting criteria, second motions of the "new on-screen" portion of the data element set to the second arrangement, and third motions of the on-screen-to-off-screen-data-elements, wherein an off-screen data element of the "off-screen" portion comes on-screen and is interspersed with data elements of the "retained on-screen" portion, and wherein the on-screen-to-off-screen-data-elements are moved to the random-off-screen locations; and displaying an animation in the GUI based on the animation data, wherein the animation starts from the first arrangement and ends in the second arrangement, wherein the first sorting criteria and the second sorting criteria are displayed as labels of columns located at top of the table as part of the displaying of the table and as part of the displaying of the animation, and wherein the columns are the same for the first arrangement and the second arrangement.

\* \* \* \* \*